United States Patent
Kawakami et al.

(10) Patent No.: US 9,972,826 B2
(45) Date of Patent: May 15, 2018

(54) METHOD FOR PRODUCING CATHODE ACTIVE MATERIAL FOR SOLID STATE BATTERY

(71) Applicant: TOYOTA JIDOSHA KABUSHIKI KAISHA, Toyota-shi, Aichi-ken (JP)

(72) Inventors: Masatsugu Kawakami, Gotemba (JP); Takamasa Ohtomo, Susono (JP); Yuki Kato, Gotemba (JP); Hisatsugu Yamasaki, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 15/054,754

(22) Filed: Feb. 26, 2016

(65) Prior Publication Data

US 2016/0268586 A1    Sep. 15, 2016

(30) Foreign Application Priority Data

Mar. 12, 2015    (JP) .................................. 2015-049231

(51) Int. Cl.
*C23C 14/00* (2006.01)
*H01M 4/04* (2006.01)
(Continued)

(52) U.S. Cl.
CPC .......... *H01M 4/0426* (2013.01); *C01G 53/50* (2013.01); *C01G 53/54* (2013.01); *H01M 4/0471* (2013.01);
(Continued)

(58) Field of Classification Search
CPC .............................. H01M 4/0426; C23C 14/08
See application file for complete search history.

(56) References Cited

U.S. PATENT DOCUMENTS

2009/0081554 A1* 3/2009 Takada .................... H01M 4/13
                                                                           429/322
2011/0217574 A1    9/2011 Toyama et al.
(Continued)

FOREIGN PATENT DOCUMENTS

CN    103022415 A    4/2013
JP    2007-005073 A    1/2007
(Continued)

OTHER PUBLICATIONS

Kobayashi et al., 5 V Class All-Solid-State Composite Lithium Battery with Li3PO4 Coated LiNi0.5Mn1.5O4, Journal of the Electrochemical Society, 150 (12), pp. A1577-A1582, 2003.

*Primary Examiner* — Timon Wanga
(74) *Attorney, Agent, or Firm* — Oliff PLC (57) ABSTRACT

A main object of the present invention is to provide a method for producing a cathode active material for a solid state battery, which is capable of reducing resistance. The present invention solves the problem by providing a method for producing a cathode active material for a solid state battery comprising steps of: a coating step of coating a coating material represented by $Li_xPO_y$ ($2 \leq x \leq 4$, $3 \leq y \leq 5$) on a surface of a cathode active material containing an Ni element and being an oxide by using a sputtering method; and a heat-treating step of forming a coating portion in such a manner that the cathode active material coated with the coating material is heat-treated within a range of 400° C. to 650° C. to diffuse the Ni element into the coating material.

4 Claims, 4 Drawing Sheets

(51) Int. Cl.

| | |
|---|---|
| *H01M 4/525* | (2010.01) |
| *H01M 4/505* | (2010.01) |
| *H01M 4/36* | (2006.01) |
| *H01M 4/62* | (2006.01) |
| *C01G 53/00* | (2006.01) |
| *H01M 10/052* | (2010.01) |
| *H01M 10/0562* | (2010.01) |

(52) U.S. Cl.
CPC ........... *H01M 4/366* (2013.01); *H01M 4/505* (2013.01); *H01M 4/525* (2013.01); *H01M 4/62* (2013.01); *C01P 2004/04* (2013.01); *C01P 2004/80* (2013.01); *H01M 10/052* (2013.01); *H01M 10/0562* (2013.01)

(56) References Cited

U.S. PATENT DOCUMENTS

2012/0052396 A1     3/2012   Tsuchida et al.
2014/0106186 A1*   4/2014   Dudney .............. H01M 4/0426
                                                                            429/50

FOREIGN PATENT DOCUMENTS

| JP | 2010-135090 A | 6/2010 |
|---|---|---|
| JP | 2011-187193 A | 9/2011 |
| WO | 2007/004590 A1 | 1/2007 |

\* cited by examiner

METHOD FOR PRODUCING CATHODE ACTIVE MATERIAL FOR SOLID STATE BATTERY

TECHNICAL FIELD

The present invention relates to a method for producing a cathode active material for a solid state battery, which is capable of reducing resistance.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently drawn attention, from the viewpoint of a high energy density among various kinds of batteries.

There have been conventionally attempts to improve performance of a lithium battery in the field of such lithium batteries, while focusing on an interface of an electrode active material. For example, in Non Patent Literature 1 and Patent Literatures 1 to 3, a technique for forming a coating layer on the surface of a cathode active material of a lithium battery is disclosed.

Specifically, in Non Patent Literature 1, a technique for coating the surface of a cathode active material comprising $LiNi_{0.5}Mn_{1.5}O_4$ with $Li_3PO_4$ by using an electrostatic atomizing method is disclosed. Also, in Non Patent Literature 1, it is disclosed that $Li_3PO_4$ coated by an electrostatic atomizing method is crystallized by heat-treating at 400° C. for 20 minutes.

Also, in Patent Literature 1, a technique for forming a coating layer in such a manner that $Al_2O_3$ and $Li_3PO_4$ are coated on the surface of a cathode active material of a lithium manganese complex oxide and heat-treated by a liquid phase method is disclosed. In addition, in Patent Literature 2, a technique for forming a coating layer in such a manner that $ZrO_2$, $Al_2O_3$ or $TiO_2$ are coated on the surface of a cathode active material composed of $LiNiCoMnO_2$ and heat-treated at 400° C. or less by a pulsed laser deposition method is disclosed. Furthermore, in Patent Literature 3, a technique for coating the surface of a cathode active material composed of $LiCoO_2$ with $Li_3PO_4$ and $Li_4SiO_4$ by using a PLD method is disclosed.

CITATION LIST

Patent Literatures

Patent Literature 1: Japanese Patent Application Laid-Open No. 2011-187193
Patent Literature 2: Japanese Patent Application Laid-Open No. 2007-005073
Patent Literature 3: Japanese Patent Application Laid-Open No. 2010-135090

Non Patent Literature

Non Patent Literature 1: Journal of The Electrochemical Society, 150(12) A1577-A1582 (2003), "5V Class All-Solid-State Composite Lithium Battery with $Li_3PO_4$ Coated $LiNi_{0.5}Mn_{1.5}O_4$"

SUMMARY OF INVENTION

Technical Problem

Incidentally, in the field of a solid state battery, a further reduction in resistance is demanded.

The present invention has been made in view of the above-mentioned actual circumstances, and the main object thereof is to provide a method for producing a cathode active material for a solid state battery, which is capable of reducing resistance.

Solution to Problem

In order to achieve the object, the present invention provides a method for producing a cathode active material for a solid state battery comprising steps of: a coating step of coating a coating material represented by $Li_xPO_y$ ($2 \leq x \leq 4$, $3 \leq y \leq 5$) on a surface of a cathode active material containing an Ni element and being an oxide by using a sputtering method; and a heat-treating step of forming a coating portion in such a manner that the cathode active material coated with the coating material is heat-treated within a range of 400° C. to 650° C. to diffuse the Ni element into the coating material.

According to the present invention, the coating step and the heat-treating step allow the Ni element to be diffused into the coating material and the coating portion to be formed. Therefore, the cathode active material for a solid state battery, which is capable of reducing resistance, may be obtained.

In the present invention, the coating portion is preferably amorphous. The reason therefor is to allow the resistance of the coating portion to be further reduced and the resistance to be effectively reduced.

In the present invention, the cathode active material is preferably $LiNi_{0.5}Mn_{1.5}O_4$ or $LiNi_{1/3}Co_{1/3}Mn_{1/3}O_2$.

Advantageous Effects of Invention

The present invention exhibits an effect such as to obtain a cathode active material for a solid state battery, which is capable of reducing resistance.

DESCRIPTION OF EMBODIMENTS

Hereinafter, a method for producing a cathode active material for a solid state battery according to the present invention will be described in detail.

The method for producing a cathode active material for a solid state battery according to the present invention comprises steps of: a coating step of coating a coating material represented by $Li_xPO_y$ ($2 \leq x \leq 4$, $3 \leq y \leq 5$) on a surface of a cathode active material containing an Ni element and being an oxide by using a sputtering method; and a heat-treating step of forming a coating portion in such a manner that the cathode active material coated with the coating material is heat-treated within a range of 400° C. to 650° C. to diffuse the Ni element into the coating material.

FIGS. 1A to 1F are a process drawing showing an example of a method for producing a cathode active material for a solid state battery of the present invention. In the present invention, as exemplified in FIGS. 1A and 1B, a cathode active material 1 containing an Ni element and being an oxide is prepared to coat a coating material such as $Li_3PO_4$ on the surface of the cathode active material 1 by using a sputtering method. Next, as exemplified in FIGS. 1C and 1D, the cathode active material 1 coated with the coating material is heat-treated at a predetermined temperature to diffuse the Ni element into the coating material; as exemplified in FIGS. 1E and 1F, a coating portion 2 is formed. Through the above, a cathode active material for a solid state battery 10 may be obtained. In the method for producing exemplified in FIGS. 1A to 1F, the cathode active material for a solid state battery 10 having the particulate cathode active material 1 and the coating portion 2 with a predetermined composition, formed on the particulate cathode active material 1, may be obtained.

Figure 1A:
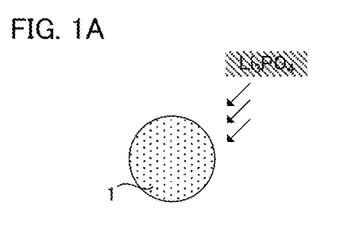
FIGS. 1A to 1F are a process drawing showing an example of a method for producing a cathode active material for a solid state battery of the present invention.
Figure 1B:
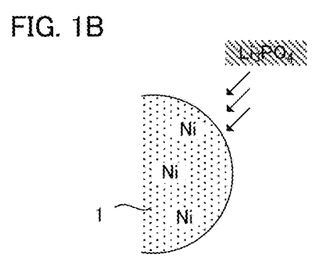
Figure 1C:
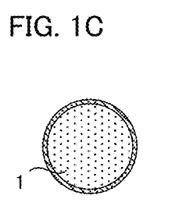
Figure 1D:
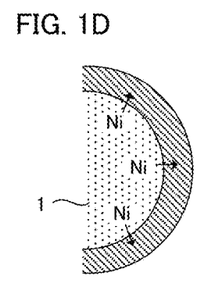
Figure 1E:
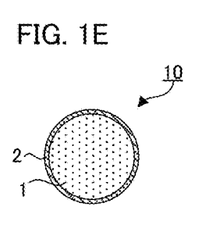
Figure 1F:
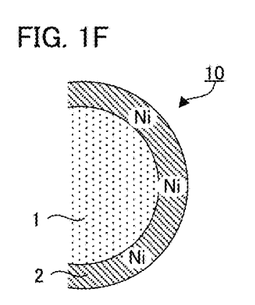
Figure 2A:
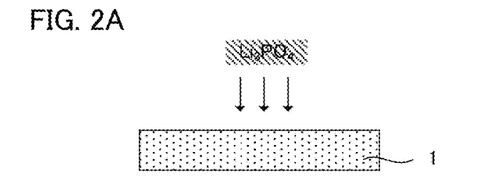
FIGS. 2A to 2C are a process drawing showing another example of a method for producing a cathode active material for a solid state battery of the present invention.
Figure 2B:
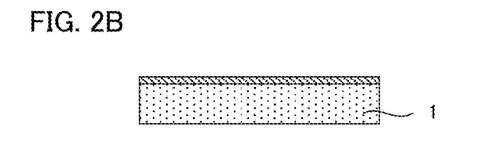
Figure 2C:
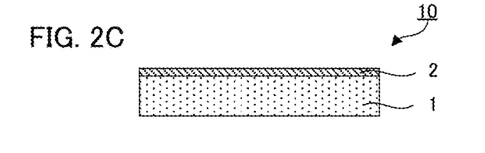

In the present invention, as exemplified in FIGS. 2A to 2C, a cathode active material for a solid state battery having the thin-film cathode active material 1 and the coating portion 2 with a predetermined structure, formed on the thin-film cathode active material 1, may be also obtained. Incidentally, the processes of FIGS. 2A to 2C are the same as the processes described in FIGS. 1A, 1C and 1E.

According to the present invention, the coating step and the heat-treating step allow the Ni element to be diffused into the coating material and the coating portion to be formed. Therefore, the cathode active material for a solid state battery, which is capable of reducing resistance, may be obtained.

In the present invention, the diffusion of the Ni element into the coating material allows resistance to be reduced. The reason therefor is not necessarily clear but is guessed as follows. That is to say, it is guessed that the heat-treating at the heat treatment temperature described above causes a reaction, such as is represented by the following chemical formula, between the cathode active material and the coating material.

Thus, with regard to the coating portion obtained by heat-treating, it is guessed that an olivine-type nickel compound such as $LiNiPO_4$ is produced. Also, it is guessed that resistance between the cathode active material and the coating portion is decreased for the reason that the coating portion contains $LiNiPO_4$.

Figure 3A:
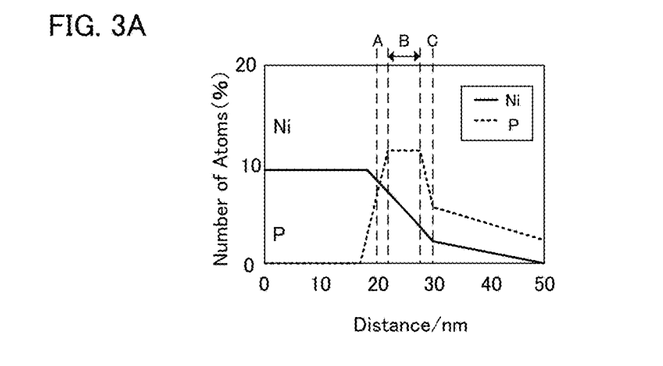
FIG. 3A is an image graph showing a component analysis result for explaining a cathode active material for a solid state battery of the present invention.

A phenomenon such that the Ni element is diffused into the coating portion may be confirmed by component analysis with the use of STEM-EDX (JEOL), for example. FIG. 3A is an image graph showing a component analysis result for explaining a cathode active material for a solid state battery of the present invention. With regard to the cathode active material for a solid state battery obtained by the present invention, the coating portion formed by using the coating material (such as $Li_3PO_4$) may be confirmed by the number of atoms of a P element (%).

Also, from the fact that with regard to the number of atoms of the Ni element (%) from an interface between the cathode active material and the coating portion to the utmost surface of the coating portion in the component analysis result, the number of atoms of the Ni element (%) decreases as it goes from the interface to the utmost surface, it may be confirmed that the Ni element contained in the coating portion is derived from the cathode active material. For example, as shown in FIG. 3A, with regard to the number of atoms of the Ni element (%) from the interface A between the cathode active material and the coating portion to the utmost surface C of the coating portion, it may be confirmed from the fact that the number of atoms of the Ni element (%) decreases as it goes from A to C.

In the present invention, the Ni element derived from the cathode active material is contained, so as to allow the coating portion to have high stability. Accordingly, resistance may be reduced by inhibiting a reaction between the cathode active material and the solid electrolyte layer or a decomposition of the solid electrolyte layer contacting with the cathode active material. In addition, in the case where the cathode active material for a solid state battery of the present invention is used for a lithium battery in which at least one of the cathode active material layer and the solid electrolyte layer contains a sulfide solid electrolyte material, the effect of the present invention such as to allow resistance to be reduced becomes remarkable by reason of allowing the cathode active material as an oxide to be inhibited from contacting with a sulfide solid electrolyte material. Furthermore, in the case where the cathode active material is a high-voltage cathode active material, the coating portion may be inhibited from reacting with the sulfide solid electrolyte to produce a high resistive layer on the occasion of being used for the solid state battery.

Each step of the method for producing a cathode active material for a solid state battery of the present invention is hereinafter described.

1. Coating Step

The coating step in the present invention is a step of coating a coating material represented by $Li_xPO_y$ ($2 \leq x \leq 4$, $3 \leq y \leq 5$) on a surface of a cathode active material containing an Ni element and being an oxide by using a sputtering method.

(1) Cathode Active Material

The cathode active material in the present invention is not particularly limited if the cathode active material contains an Ni element, is an oxide and functions as a cathode active material for a solid state battery. Also, the cathode active material may further contain at least one of an Mn element and a Co element. Specific examples thereof include rock salt bed type active materials such as $LiNi_{1/3}Co_{1/3}Mn_{1/3}O_2$ and $LiNi_{1/2}Mn_{1/2}O_2$, and spinel type active materials such as $LiNi_{0.5}Mn_{1.5}O_4$. Among them, $LiNi_{1/3}Co_{1/3}Mn_{1/3}O_2$ or $LiNi_{0.5}Mn_{1.5}O_4$ is preferable.

The cathode active material in the present invention is preferably a high-voltage cathode active material. The reason therefor is that the effect of the present invention such as to allow resistance to be reduced becomes remarkable. The charging potential of the cathode active material in the present invention is preferably 4.5 V or more, above all, preferably 4.55 V or more, particularly, preferably 4.6 V or more with respect to Li metal potential.

Examples of the shape of the cathode active material include a particulate shape as FIG. 1A. The average particle diameter ($D_{50}$) of the particles is, for example, preferably within a range of 0.1 μm to 50 μm. Other examples of the shape of the cathode active material include a thin film as FIG. 2A. The thickness of the thin film is, for example, preferably within a range of 10 nm to 1 μm.

(2) Coating Material

The coating material used in the present step is represented by $Li_xPO_y$ ($2 \leq x \leq 4$, $3 \leq y \leq 5$). In the present invention, the coating material is more preferably $Li_3PO_4$. The reason therefor is that $Li_3PO_4$ is selected as the coating material and reacted with Ni contained in the cathode active material, so as to allow the coating portion with high stability at high voltage.

The average thickness and coverage factor of the coating material coated on the surface of the cathode active material preferably allow the coating portion described later to be obtained, and may be the same as the average thickness and coverage factor of the coating portion.

(3) Sputtering Method

A sputtering method in the present step is not particularly limited if the method may coat the coating material on the surface of the cathode active material. Examples thereof include a barrel sputtering method, a magnetron sputtering method, a reactive sputtering method, a pole-pole array and an ion beam sputtering method, but a usage of a barrel sputtering method is preferable in the present step. The reason therefor is to allow the particulate or thin-film cathode active material to be uniformly coated.

2. Heat-Treating Step

The heat-treating step in the present invention is a step of forming a coating portion in such a manner that the cathode active material coated with the coating material is heat-treated within a range of 400° C. to 650° C. to diffuse the Ni element into the coating material.

(1) Heat-Treating

The temperature in the heat-treating step is ordinarily 400° C. or more, more preferably 450° C. or more, and particularly preferably 550° C. or more. The reason therefor is that if heat treatment temperature is too low, it may possibly be difficult to cause the Ni element contained in the cathode active material to be sufficiently diffused into the coating material. On the other hand, the heat treatment temperature is ordinarily 650° C. or less, more preferably 600° C. or less. The reason therefor is that if heat treatment temperature is too high, lithium is likely to be desorbed from the coating portion to increase resistance.

The heat treatment time is not particularly limited if the time allows the desired coating portion to be obtained, but is, for example, preferably within a range of 1 hour to 20 hours, more preferably within a range of 3 hours to 8 hours. The reason therefor is that if heat treatment time is too short, it may possibly be difficult to cause the Ni element contained in the cathode active material to be sufficiently diffused into the coating material. On the other hand, the reason therefor is that if heat treatment time is too long, it is likely to deteriorate the cathode active material.

The heat treatment may be performed in an air atmosphere, an inert gas atmosphere (such as an Ar gas atmosphere), a reduced-pressure atmosphere and a vacuum. In the present invention, an air atmosphere is more preferable. A method for heat-treating is not particularly limited and a burning furnace may be used, for example.

(2) Coating Portion

The coating portion in the present invention is formed on a surface of the cathode active material. The coating portion is formed by diffusing the Ni element into the coating material. In other words, the coating portion contains a Li element, a P element, an O element and the Ni element derived from the cathode active material.

Also, in the present invention, the coating portion is preferably amorphous. The reason therefor is to allow the resistance of the coating portion to be further reduced and the resistance to be effectively reduced.

By the way, as described above, it has been conventionally general that $Li_3PO_4$ is crystallized by heat-treating at 400° C. or more to increase resistance. Also, in Non Patent Literature 1, it is disclosed that $Li_3PO_4$ is crystallized by heating at 400° C. in a technique for coating the surface of a cathode active material composed of $LiNi_{0.5}Mn_{1.5}O_4$ with $Li_3PO_4$ by using an electrostatic atomizing method.

On the contrary, in the present invention, even in the case where the cathode active material coated with the coating material is heat-treated within a range of 400° C. to 650° C., the crystallization is not caused and amorphous nature may be maintained. The reason therefor is not necessarily clear but it is guessed that on the occasion of coating the coating material by using a sputtering method, the composition of the coating material accumulated on a surface of the cathode active material changes and the coating material is not crystallized even in the case of heat-treating in the temperature range described above. Also, it is guessed that the composition of the coating material changes due to the diffusion of the Ni element into the coating material and the coating material is not crystallized even in the case of heat-treating in the temperature range described above.

It is an unanticipated effect from a conventional method for producing the cathode active material that the coating conditions described above and the heat treatment temperature of high temperature allow the cathode active material with reduced resistance to be obtained.

It may be confirmed by an observation image through a scanning transmission electron microscope (STEM), for example, that the coating portion is amorphous.

Also, in the present invention, it is preferable that the coating portion does not have an $Li_3PO_4$ phase. The fact that the coating portion does not have a crystal phase of $Li_3PO_4$ may be confirmed by using a method such as X ray diffraction (XRD) measurement. Specifically, it may be confirmed by X ray diffraction measurement using a CuKU ray that the coating portion does not have a peak position of 2θ of a crystal phase of $Li_3PO_4$.

Here, 'the coating portion' in the present invention signifies those be formed on a surface of the cathode active material, and may be confirmed from the number of atoms of the P element (%) on the occasion of subjecting the cathode active material for a solid state battery to component analysis, as described above. Specifically, as shown in FIG. 3A, on the occasion of performing component analysis with the use of STEM-EDX (JEOL), a location (nm) in which the number of atoms of the P element (%) becomes the maximum value may be specified; next, a region (distance (nm)) in which the number of the atoms (%) becomes a half value or more of the maximum value while including the location (nm) in which the number of atoms of the P element (%) becomes the maximum value may be specified as the coating portion. Accordingly, for example, in the cathode active material for a solid state battery shown in FIG. 3A, the maximum value of the number of atoms of the P element is 12%, so that a region of 20 nm to 30 nm in which the number of atoms becomes a half value of 12%, namely, 6% or more while including the location (22 nm to 28 nm) in which the number of atoms is 12% may be specified as the coating portion.

Also, 'an interface between the cathode active material and the coating portion' in the present invention signifies a location A (20 nm), located on the side which the number of atoms of the Ni element (%), is larger in a region (20 nm to 30 nm) in which the number of atoms of the P element (%) becomes a half value (6%) or more of the maximum value (12%), as shown in FIG. 3A, for example. Also, 'an utmost surface of the coating portion' in the present invention signifies a location C (30 nm), located on the opposite side to the location A, in the region described above.

The coating portion in the present invention is not particularly limited if the coating portion is such as to contain a Li element, a P element, an O element and the Ni element derived from the cathode active material, but preferably has a $PO_4^3$ structure, for example. Specifically, the coating portion preferably contains $LiNiPO_4$. The reason therefor is to allow the coating portion to have high stability at high voltage.

With regard to the cathode active material for a solid state battery of the present invention, a ratio (Ni/P) of the Ni element to the P element is preferably 1 or more at an interface between the cathode active material and the coating portion; the value of Ni/P is more preferably 1.1 or more, particularly preferably 1.2 or more. Also, the value of Ni/P is preferably 2 or less at the interface. As the value of Ni/P is too large, structural change of the cathode active material is likely to become large thereby increasing resistance.

Incidentally, the value of Ni/P may be calculated from the number of atoms (%), which is obtained by the number of atoms of the Ni element and the P element (%) measured by energy-dispersive X ray spectrometry (EDX), for example.

In addition, with regard to the cathode active material for a solid state battery of the present invention, the value of Ni/P in a location (distance (nm)) in which the number of atoms of the P element (%) becomes the maximum value in a thickness direction of the coating portion is preferably 0.3 or more, more preferably 0.4 or more. Also, the value of Ni/P in the location is preferably 0.6 or less, more preferably 0.5 or less. The value of Ni/P in the location is within the range, so as to allow the Ni element derived from the cathode active material to be sufficiently diffused into the coating portion and allow resistance to be reduced.

Furthermore, with regard to the cathode active material for a solid state battery of the present invention, the value of Ni/P on the utmost surface of the coating portion is preferably 0.2 or more. Also, the value of Ni/P on the utmost surface of the coating portion is preferably 0.3 or less. The reason therefor is that the value of Ni/P in the location is within the range, so as to allow the Ni element derived from the cathode active material to be sufficiently diffused into the coating portion and allow resistance to be reduced.

The average thickness of the coating portion is not particularly limited if the effect of the present invention such as to allow resistance to be reduced is obtained, but is, for example, preferably within a range of 1 nm to 50 nm, above all, preferably within a range of 3 nm to 40 nm, particularly, preferably within a range of 5 nm to 30 nm. In the case where the average thickness of the coating portion is too thin, the cathode active material and the solid electrolyte layer are likely to react, while in the case where the average thickness of the coating portion is too thick, ion conductivity is likely to deteriorate. Incidentally, the average thickness of the coating portion may be measured by using a transmission electron microscope (TEM), for example.

Also, the coverage factor of the coating portion on a surface of the cathode active material is preferably high. Specifically, the coverage factor is preferably 50% or more, above all, preferably 80% or more. Also, the coating portion may cover the whole surface of the cathode active material. Incidentally, the coverage factor of the coating portion may be measured by using a transmission electron microscope (TEM) and an X ray photoelectron spectrometry (XPS), for example.

3. Other Steps

With regard to the method for producing a cathode active material for a solid state battery of the present invention, necessary steps in addition to the coating step and heat-treating step described above may be properly selected and added. For example, the method may have a drying step of drying the cathode active material with the coating portion formed.

4. Cathode Active Material for Solid State Battery

The cathode active material for a solid state battery produced by the present invention has the cathode active material and coating portion described above.

The cathode active material for a solid state battery is used for a solid state battery. The solid state battery ordinarily has a cathode active material layer, an anode active material layer, and a solid electrolyte layer formed between the cathode active material layer and the anode active material layer. In the present invention, the solid state battery is preferably a lithium battery. Also, with regard to the lithium battery, at least one of the cathode active material layer and the solid electrolyte layer preferably contains a sulfide solid electrolyte. The reason therefor is that at least either one of the cathode active material layer and the solid electrolyte layer may be inhibited from decomposing and resistance may be inhibited from increasing.

The cathode active material layer is a layer containing the cathode active material for a solid state battery, and may further contain at least one of a solid electrolyte material, a conductive material and a binder as required.

Examples of the solid electrolyte material include a sulfide solid electrolyte material, an oxide solid electrolyte material, a nitride solid electrolyte material and a halide solid electrolyte material; among them, preferably a sulfide solid electrolyte material. The reason therefor is high Li ion conductivity. Incidentally, a sulfide solid electrolyte material is so higher in reactivity than an oxide solid electrolyte material as to easily react with the cathode active material and easily form a high resistive layer between the cathode active material.

Examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$≥$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n are positive numbers, and Z is any of Ge, Zn and Ga), $Li_2S$—$GeS_2$, $Li_2S$—$SiS_2$—$Li_3PO_4$, and $Li_2S$—$SiS_2$—$Li_xMO_y$ (provided that x and y are positive numbers, and M is any of P, Si, Ge, B, Al, Ga and In). Incidentally, the description of the '$Li_2S$—$P_2S_5$' above signifies the sulfide solid electrolyte material obtained by using a raw material composition containing $Li_2S$ and $P_2S_5$, and other descriptions signify likewise.

The cathode active material layer in the present invention may further contain a conductive material. The addition of the conductive material allows electrical conductivity of the cathode active material layer to be improved. Examples of the conductive material include carbon materials such as acetylene black, Ketjenblack and carbon fiber, and metal materials. Also, the cathode active material layer may further contain a binder. Examples of the binders include fluorine-containing binders such as PTFE and PVDF. Also, the thickness of the cathode active material layer varies with the constitution of an intended lithium battery, but is preferably within a range of 0.1 μm to 1000 μm, for example.

The anode active material layer is a layer containing at least an anode active material, and may further contain at least one of a solid electrolyte material, a conductive material and a binder, as required. Examples of the anode active material include a metal active material and a carbon active material. Examples of the metal active material include a Li alloy, In, Al, Si, and Sn. On the other hand, examples of the carbon active material include graphite such as mesocarbon microbeads (MCMB) and highly oriented pyrolytic graphite (HOPG), and amorphous carbon such as hard carbon and soft carbon. Incidentally, SiC may be also used as the anode active material for example. The solid electrolyte material, the conductive material and the binder are the same as the contents described above. The thickness of the anode active material layer is preferably within a range of 0.1 μm to 1000 μm, for example.

The solid electrolyte layer in the present invention is a layer formed between the cathode active material layer and the anode active material layer, and a layer containing at least a solid electrolyte material. The solid electrolyte material is the same as the contents described above. In the present invention, above all, the solid electrolyte layer preferably contains a sulfide solid electrolyte material. The thickness of the solid electrolyte layer is, for example, preferably within a range of 0.1 μm to 1000 μm, more preferably within a range of 0.1 μm to 300 μm.

The solid state battery ordinarily comprises a cathode current collector for collecting the cathode active material layer and an anode current collector for collecting the anode active material layer. Furthermore, the solid state battery has a battery case.

The solid state battery may be a primary battery or a secondary battery, but preferably a secondary battery among them. The reason therefor is because the secondary battery can be repeatedly charged and discharged and is useful as a car-mounted battery, for example.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

(Production of Cathode Active Material for Solid State Battery)

A powdery cathode active material ($LiNi_{0.5}Mn_{1.5}O_4$, NICHIA CORPORATION) was prepared to be coated its surface with a coating material ($Li_3PO_4$ target (Toshima Manufacturing Co., Ltd.)) by a powder barrel sputtering method so that the average thickness became 10 nm.

The cathode active material coated with the coating material was heat-treated in an air atmosphere at 400° C. for 5 hours to form a coating portion and obtain a cathode active material for a solid state battery.

Thereafter, the cathode active material for a solid state battery obtained in the above was dried for 10 hours under a sufficiently exhausted atmosphere. Incidentally, the temperature at this time was 120° C.

(Production of Cathode Mixture)

$LiNi_{0.5}Mn_{1.5}O_4$ obtained by the production of the cathode active material for a solid state battery described above, $LiI-Li_2S-P_2S_5$ (solid electrolyte) and carbon nanotube (VGCF™-H, conductive material, Showa Denko K.K.) were mixed at a ratio of $LiNi_{0.5}Mn_{1.5}O_4$:$LiI-Li_2S-P_2S_5$: carbon nanotube=50:50:5 (volume ratio) to obtain a powdery cathode mixture.

(Production of Anode Mixture)

Graphite (anode active material, Mitsubishi Chemical Corporation) and $LiI-Li_2S-P_2S_5$ (solid electrolyte) were mixed at a ratio of graphite: $LiI-Li_2S-P_2S_5$=50:50 (volume ratio) to obtain an anode mixture.

(Production of Solid Electrolyte Layer)

A solid electrolyte layer comprising $LiI-Li_2S-P_2S_5$ was produced.

(Production of Current Collector)

A current collector was produced by using stainless steel.

(Production of Evaluation Battery)

An evaluation battery of a powder compacting system press cell (φ11.28 mm) as a cell system was produced through the following procedure. Put in a cylinder made of macole and pressed at 1 ton/cm$^2$ was 65.0 mg of electrolyte powder, then 19.4 mg of the cathode mixture powder was put thereon and pressed at 1 ton/cm$^2$, and 11.9 mg of the anode mixture powder was put on the other side thereof and pressed at 4.3 ton/cm$^2$, and thereafter clamped at a torque of 6 N·m by three bolts, and put in a closed vessel to produce a battery, which was subject to charge and discharge evaluation.

Examples 2 to 6

An evaluation battery was produced in the same manner as Example 1 except for modifying each of the heat treatment temperature into 450° C. (Example 2), 500° C. (Example 3), 550° C. (Example 4), 600° C. (Example 5) and 650° C. (Example 6).

Example 7

An evaluation battery was produced in the same manner as Example 4 except for using $LiNi_{1/3}Co_{1/3}Mn_{1/3}O_2$ as the cathode active material.

Comparative Examples 1 to 4

An evaluation battery of Comparative Example 1 was produced in the same manner as Example 1 except for not conducting a heat-treatment. Also, an evaluation battery was produced in the same manner as Example 1 except for modifying each of the heat treatment temperature into 300° C. (Comparative Example 2), 350° C. (Comparative Example 3) and 700° C. (Comparative Example 4).

Comparative Example 5

An evaluation battery was produced in the same manner as Comparative Example 1 except for using $LiNi_{1/3}Co_{1/3}Mn_{1/3}O_2$ as the cathode active material.

[Evaluation 1]

(Evaluation of Resistance During Charge and Discharge Cycles)

The evaluation of resistance during charge and discharge cycles was performed by using the evaluation battery obtained in Examples 1 to 7 and Comparative Examples 1 to 5. Specifically, first, charging was performed at a current of 0.1 C (0.1836 mA/cm$^2$) until against-lithium metal potential of the cathode became 5.0 V, and charging was finished when the current became 0.01 C. Next, discharging was performed at a current of 0.1 C until against-lithium metal potential of the cathode became 3.6 V in Examples 1 to 6 and Comparative Examples 1 to 4 and 3.1 V in Example 7 and Comparative Example 5, and discharging was finished when the current became 0.01 C. Such a cycle was performed at 25° C. once. The evaluation battery obtained in Examples 1 to 7 and Comparative Examples 1 to 5 was discharged at 25° C. and constant current from a charged state to 20% of the capacity, and resistance was calculated from voltage drop at that time.

Figure 4:
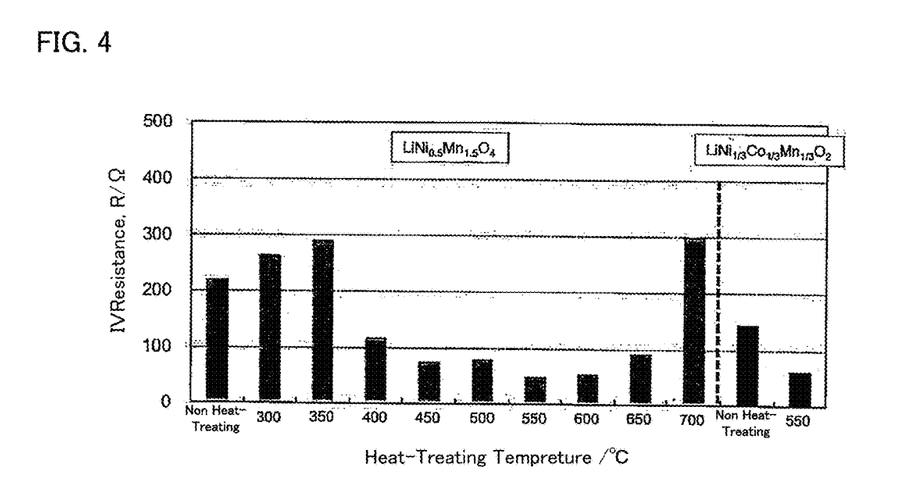
FIG. 4 is a graph showing a resistance value in each of Examples 1 to 6 and Comparative Examples 1 to 5.

The resistance value of Examples 1 to 7 and Comparative Examples 1 to 5 after one cycle was shown in Table 1 and FIG. 4. As shown in Table 1 and FIG. 4, it is confirmed that battery resistance was reduced in the case of heat-treating within a range of 400° C. to 650° C. as compared with the case of not heat-treating the cathode active material for a solid state battery. Also, it is confirmed that resistance of the battery after charge and discharge cycles was reduced most in Example 4, in which heat treatment was particularly performed at 550° C., among Examples 1 to 6 using LiNi$_{0.5}$Mn$_{1.5}$O$_4$.

TABLE 1

| | Cathode Active Material | Heat-Treating Tempreture (° C.) | Resistance (Ω) |
|---|---|---|---|
| Example 1 | LiNi$_{0.5}$Mn$_{1.5}$O$_4$ | 400 | 117 |
| Example 2 | LiNi$_{0.5}$Mn$_{1.5}$O$_4$ | 450 | 75 |
| Example 3 | LiNi$_{0.5}$Mn$_{1.5}$O$_4$ | 500 | 81 |
| Example 4 | LiNi$_{0.5}$Mn$_{1.5}$O$_4$ | 550 | 50 |
| Example 5 | LiNi$_{0.5}$Mn$_{1.5}$O$_4$ | 600 | 56 |
| Example 6 | LiNi$_{0.5}$Mn$_{1.5}$O$_4$ | 650 | 92 |
| Example 7 | LiNi$_{1/3}$Co$_{1/3}$Mn$_{1/3}$O$_2$ | 550 | 62 |
| Comparative Example 1 | LiNi$_{0.5}$Mn$_{1.5}$O$_4$ | — | 221 |
| Comparative Example 2 | LiNi$_{0.5}$Mn$_{1.5}$O$_4$ | 300 | 265 |
| Comparative Example 3 | LiNi$_{0.5}$Mn$_{1.5}$O$_4$ | 350 | 292 |
| Comparative Example 4 | LiNi$_{0.5}$Mn$_{1.5}$O$_4$ | 700 | 300 |
| Comparative Example 5 | LiNi$_{1/3}$Co$_{1/3}$Mn$_{1/3}$O$_2$ | — | 145 |

Also, in Comparative Examples 2 and 3, resistance was increased in the case of heat-treating the cathode active material coated with the coating material at 300° C. or 350° C. as compared with the case of not heat-treating; on the contrary, in Example 1, it was confirmed that resistance was reduced in the case of heat-treating at 400° C. as compared with the case of not heat-treating. From this result, a dramatic change is observed in a tendency of the increase and decrease of resistance between the case of heat-treating at less than 400° C. and the case of heat-treating at 400° C. or more. The reason to cause such a change in the tendency is not necessarily clear but is guessed as follows. It is guessed that the diffusion of the Ni element into the coating material starts at a specific temperature within a range of more than 350° C. and 400° C. or less.

[Evaluation 2]
(Evaluation of Composition)
The component analysis of the cathode active material for a solid state battery was performed by using STEM-EDX (JEOL).

Figure 5:
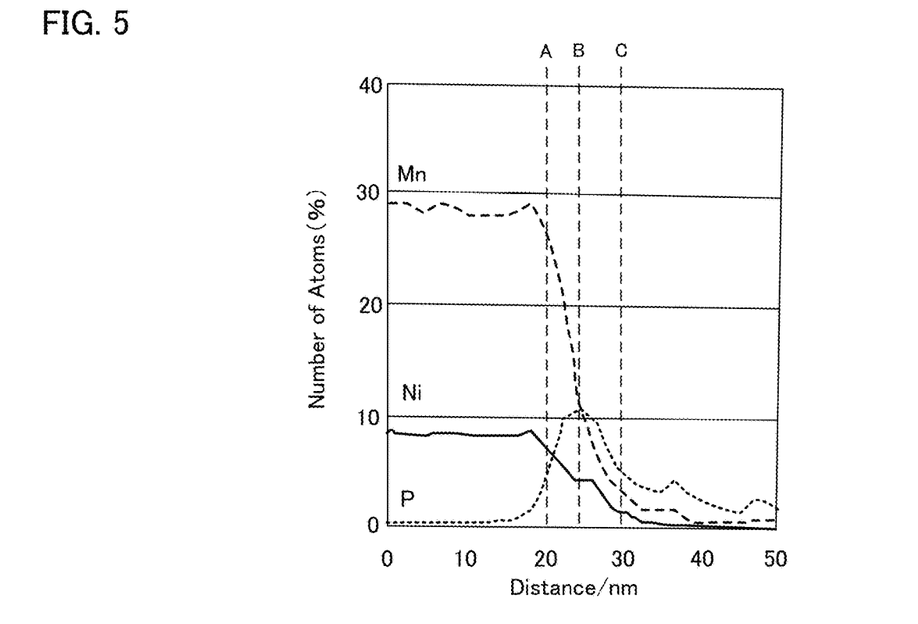
FIG. 5 is a graph showing a result of component analysis of Example 4.

The component analysis result of Example 4 is shown in FIG. 5 and Table 2. As shown in FIG. 5 and Table 2, through the number of atoms of the Mn element and the Ni element contained in the cathode active material and the number of atoms of the P element contained in the coating material, it was confirmed that the coating portion was formed on a surface of the cathode active material. Also, it was found that the heat-treated coating portion contained the Ni element derived from the cathode active material.

TABLE 2

| | A | B | C | A~C |
|---|---|---|---|---|
| Distance (nm) | 20 | 24 | 28 | 8 |
| Number of Atoms of P Element (%) | 5.3 | 10.6 | 6.9 | 5.3 ≤ P ≤ 10.6 |
| Ratio of Number of Ni/P Element | 1.3 | 0.4 | 0.3 | 0.3 ≤ Ni/P ≤ 1.3 |

Figure 6A:
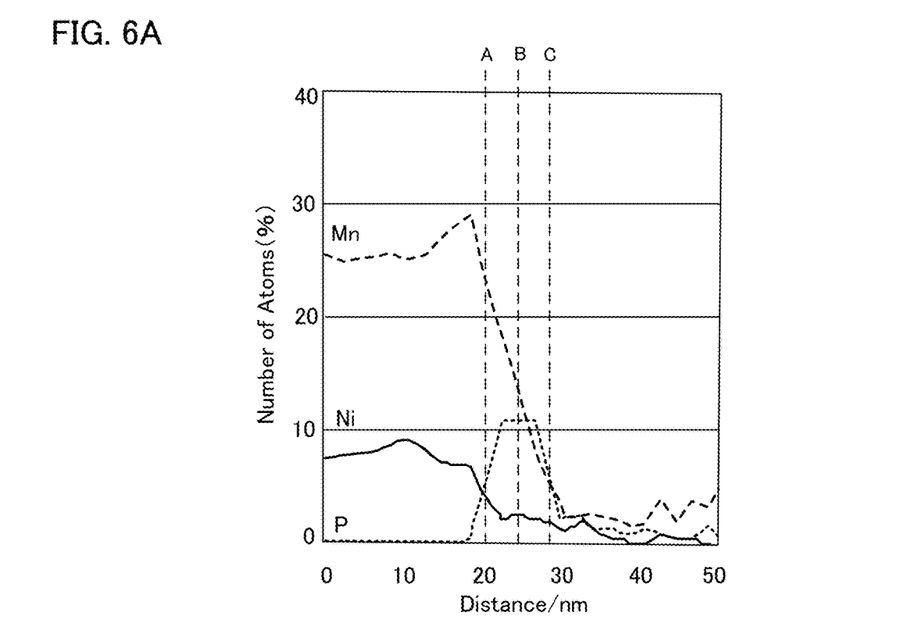
FIG. 6A is a graph showing a result of component analysis of Comparative Example 1.

The component analysis result of Comparative Example 1 is shown in FIG. 6A and Table 3. As shown in FIG. 6A and Table 3, through the number of atoms of the Mn element and the Ni element contained in the cathode active material and the number of atoms of the P element contained in the coating material, it was confirmed that the coating portion was formed on a surface of the cathode active material.

TABLE 3

| | A | B | C | A~C |
|---|---|---|---|---|
| Distance (nm) | 20 | 24 | 30 | 10 |
| Number of Atoms of P Element (%) | 5.6 | 11.0 | 5.3 | 5.3 ≤ P ≤ 11.0 |
| Ratio of Number of Ni/P Element | 0.8 | 0.2 | 0.4 | 0.2 ≤ Ni/P ≤ 0.8 |

It was confirmed from the result of STEM-EDX (JEOL) that the value of Ni/P at a position of "B" in the coating portion increased in Example 4 as compared with Comparative Example 1. The reason therefor is conceived that the cathode active material and the coating material cause the following reaction due to the heat treatment.

Li$_3$PO$_4$+Ni$^{2+}$→LiNiPO$_4$+2Li$^+$

Figure 7:
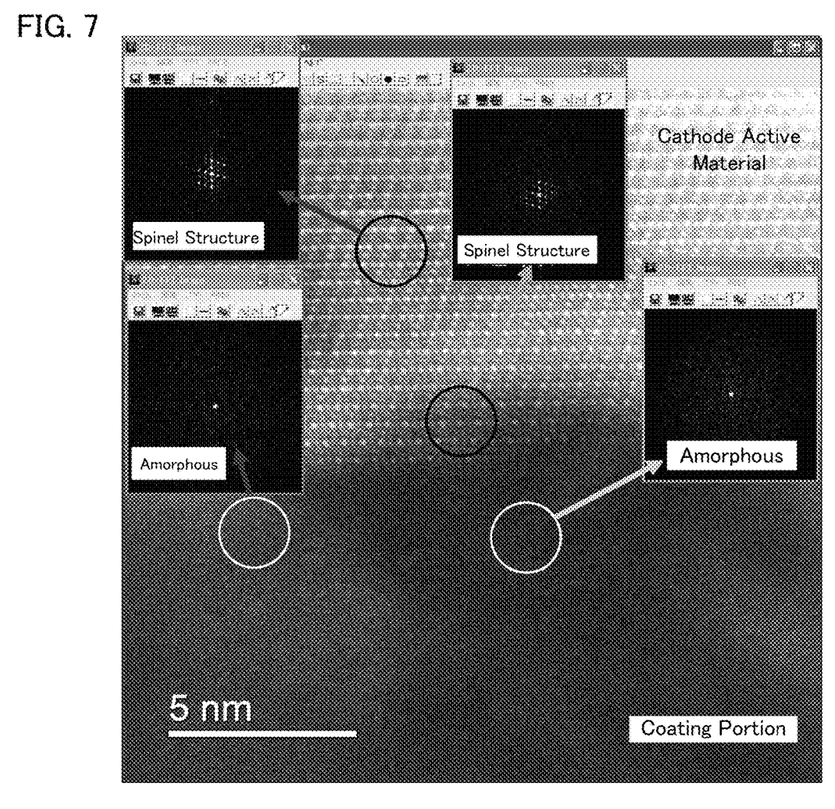
FIG. 7 is an STEM observation image of a cathode active material for a solid state battery of Example 4.

[Evaluation 3]
(Evaluation of Composition)
With regard to the cathode active material for a solid state battery of Example 4, BT-STEM observation image and HAADF-STEM observation image at an interface between the cathode active material and the coating portion were taken. It was confirmed from the obtained STEM observation images that the cathode active material had a crystal structure because a pattern was observed, and the coating portion was amorphous because a pattern was not observed (FIG. 7).

Also, when X ray diffraction (XRD) measurement was performed for the cathode active material for a solid state battery of Example 4, the peak of Li$_3$PO$_4$ phase was not confirmed.

REFERENCE SIGNS LIST

1 . . . cathode active material
2 . . . coating portion
10 . . . cathode active material for solid state battery

What is claimed is:
1. A method for producing a cathode active material complex for a solid state battery, the method comprising:

coating, by a sputtering method, a coating material represented by $Li_xPO_y$ ($2 \leq x \leq 4$, $3 \leq y \leq 5$) on a surface of a cathode active material that contains an Ni element and is an oxide; and forming a coating portion by heat-treating the cathode active material coated with the coating material within a range of 400° C. to 650° C. to diffuse the Ni element into the coating material.

2. The method for producing a cathode active material complex for a solid state battery according to claim 1, wherein the coating portion is amorphous.

3. The method for producing a cathode active material complex for a solid state battery according to claim 1, wherein the cathode active material is $LiNi_{0.5}Mn_{1.5}O_4$ or $LiNi_{1/3}Co_{1/3}Mn_{1/3}O_2$.

4. The method for producing a cathode active material complex for a solid state battery according to claim 1, wherein the cathode active material coated with the coating material is heat-treated within a range of 550° C. to 650° C.

* * * * *